United States Patent
Du et al.

(10) Patent No.: US 11,544,543 B2
(45) Date of Patent: Jan. 3, 2023

(54) APPARATUS AND METHOD FOR SPARSE TRAINING ACCELERATION IN NEURAL NETWORKS

(71) Applicant: Shanghai Cambricon Information Technology Co., Ltd., Pudong New Area (CN)

(72) Inventors: Zidong Du, Pudong New Area (CN); Shengyuan Zhou, Pudong New Area (CN); Shaoli Liu, Pudong New Area (CN); Tianshi Chen, Pudong New Area (CN)

(73) Assignee: SHANGHAI CAMBRICON INFORMATION TECHNOLOGY CO., LTD., Pudong New Area (CN)

( * ) Notice: Subject to any disclaimer, the term of this patent is extended or adjusted under 35 U.S.C. 154(b) by 492 days.

(21) Appl. No.: 16/698,984

(22) Filed: Nov. 28, 2019

(65) Prior Publication Data

US 2020/0125938 A1    Apr. 23, 2020

Related U.S. Application Data

(63) Continuation of application No. 16/698,976, filed on Nov. 28, 2019, which is a continuation-in-part of (Continued)

(30) Foreign Application Priority Data

Jun. 21, 2017   (CN) .......................... 201710474297.9

(51) Int. Cl.
G06N 3/063    (2006.01)
G06N 3/04    (2006.01)
(Continued)

(52) U.S. Cl.
CPC .......... G06N 3/063 (2013.01); G06F 9/3001 (2013.01); G06F 9/30094 (2013.01);
(Continued)

(58) Field of Classification Search
CPC .................................................... G06N 3/063
See application file for complete search history.

(56) References Cited

U.S. PATENT DOCUMENTS

2017/0169326 A1*  6/2017  Diamos ................. G06N 3/088
2018/0046900 A1*  2/2018  Dally .................. G06F 9/30018

FOREIGN PATENT DOCUMENTS

CN          1838031 A     9/2006
CN       101854526 A    10/2010
(Continued)

OTHER PUBLICATIONS

CN 201710441977.0—Second Office Action, dated Sep. 15, 2020, 9 pages.
(Continued)

*Primary Examiner* — Michael D. Yaary
(74) *Attorney, Agent, or Firm* — Getech Law LLC; Jun Ye (57) ABSTRACT

A computing device, comprising: a computing module, comprising one or more computing units; and a control module, comprising a computing control unit, and used for controlling shutdown of the computing unit of the computing module according to a determining condition. Also provided is a computing method. The computing device and method have the advantages of low power consumption and high flexibility, and can be combined with the upgrading mode of software, thereby further increasing the computing speed, reducing the computing amount, and reducing the computing power consumption of an accelerator.

19 Claims, 3 Drawing Sheets

Related U.S. Application Data application No. PCT/CN2018/090901, filed on Jun. 12, 2018.

(51) Int. Cl.
  *G06F 9/30* (2018.01)
  *G06N 3/02* (2006.01)
  *G06V 10/70* (2022.01)

(52) U.S. Cl.
  CPC .......... *G06F 9/30145* (2013.01); *G06N 3/02* (2013.01); *G06N 3/04* (2013.01); *G06V 10/70* (2022.01)

(56) References Cited

FOREIGN PATENT DOCUMENTS

| CN | 104539263 A | 4/2015 |
| CN | 105320495 A | 2/2016 |
| CN | 105512723 A | 4/2016 |
| CN | 106779068 A | 5/2017 |
| CN | 106796668 A | 5/2017 |
| CN | 109086880 A | 12/2018 |

OTHER PUBLICATIONS

CN 201710473955.2—First Office Action, dated Mar. 2, 2020, 3 pages. (No English Translation).
CN 201710473955.2—Second Office Action, dated May 15, 2020, 3 pages. (No English Translation).
CN 201710473955.2—Third Office Action, dated Aug. 24, 2020, 4 pages. (No English Translation).
CN 201710474297.9—First Office Action, dated May 15, 2020, 3 pages. (No English Translation).
CN 201710474297.9—Second Office Action, dated Nov. 12, 2020, 9 pages. (no English Translation).
CN 201710483182.6—First Office Action, dated Apr. 29, 2020, 9 pages. (no English Translation).
CN 201710495795.1—First Office Action, dated Dec. 30, 2019, 3 pages. (no English Translation).
CN 201710495795.1—Second Office Action, dated Mar. 25, 2020, 4 pages. (no English Translation).
PCT/CN2018/090901—International Search Report, dated Aug. 27, 2018, 10 pages. (no English translation).
EP 18818258.8—Response to the Invitation to File Search Results Pursuant to Rule 70b(1) EPC dated Feb. 4, 2021, filed Feb. 18, 2021, 8 pages.
EP 18818258.8—Extended European Search Report, dated Jul. 21, 2020, 9 pages.
EP 18818258.8—Response to Extended European Search Report dated Jul. 21, 2020, mailed Jan. 26, 2021, 14 pages.
Zhang, et al., "Power Optimization in Multipliers Using Multi-Precision Combined with Voltage Scaling Techniques", EEE 1st Int'l Symposium on Quality Electronic Design-Asia, 2009, 4 pages.
Fayed, et al., "A Novel Architecture for Low-Power Design of Parallel Multipliers", Proceedings IEEE Computer Society Workshop on VLSI 2001. Emerging Technologies for VLSI Systems, 2001, pp. 149-154.
EP 19217768.1—Response to Extended European Search Report dated Apr. 24, 2020, mailed Nov. 25, 2020, 11 pages.
ZP 19217768.1—Response to Extended European Search Report dated Dec. 3, 2020, mailed Jan. 29, 2021, 8 pages.
PCT/CN2018/090901—Search Report, dated Aug. 21, 2018, 9 pages.
CN 201710441977.0, Official Action dated Apr. 7, 2020, 8 pages.
Shijin Zhang, et al. "Cambricon-X: An Accelerator for Sparse Neural Networks"; 49th Annual IEEE/ACM International Symposium on Microarchitecture; University of Chinese Academy of Sciences, Beijing, China; Dec. 15, 2016, 12 pages.
EP19217768.1, European Search Report dated Apr. 24, 2020, 9 pages.
Alham Fikri Aji et al., "Sparse Communication for Distributed Gradient Descent", ARXIV.org, Cornell University Library, 201 OLIN Library Cornell University Ithaca, NY 14853, Apr. 17, 2017, 6 pages.
Wei Wen et al., "TemGrad: Ternary Gradients to Reduce Communication in Distributed Deep Learning", ARXIV.org, Cornell University Library, 201 OLIN Library Cornell University Ithaca, NY 14853, May 22, 2017, 13 pages.

* cited by examiner

APPARATUS AND METHOD FOR SPARSE TRAINING ACCELERATION IN NEURAL NETWORKS

TECHNICAL FIELD

The disclosure relates to the field of artificial intelligence, and specifically relates to a sparse training device.

BACKGROUND

As the foundation of many current artificial intelligence applications, deep neural networks have been applied in various fields such as speech recognition, image processing, data analysis, advertisement recommendation system, and automated driving, which is considered as a breakthrough. Deep neural networks have thus gained a growing presence in many aspects of human life. However, the large quantity of operations performed by deep neural networks have always been a constraint for their development speed and further applications. When considering adopting an accelerator to improve the operation speed of a deep neural network, the numerous operations would inevitably cause great energy consumption and overhead, and similarly, constrain the further application of the accelerator.

Neural network operation can mainly be divided into two parts: forward inference and back training. However, most of the existing accelerators only support forward inference and do not support back training, which causes a problem that the accelerators can only accelerate forward inference and cannot accelerate back training. Thus, the existing accelerators have limitations as they fail to accelerate the whole training process of the neural network.

SUMMARY

In order to solve the problem or partially mitigate the problem, the present disclosure provides a sparse training device. The sparse training device can support forward inference of a sparse or dense neural network as well as accelerate back training. Therefore, the device can be used for accelerating the training process of the whole neural network.

The present disclosure provides a training device, where the training device may include:

a data processing module configured to compress or expand input data; and an operation module connected to the data processing module for receiving data processed by the data processing module to perform operations.

In an example of the disclosure, the data processing module may include:

a data compression unit configured to compress input data according to a compression determination condition; and a data expansion unit configured to expand input data according to an expansion determination condition.

In an example of the disclosure, the data expansion unit may be configured to expand input data by expanding compressed sparse data into an uncompressed format.

In an example of the disclosure, the compression determination condition and the expansion determination condition may include a threshold determination condition or a function mapping determination condition.

In an example of the disclosure, the threshold determination condition may include: being less than a given threshold, being greater than a given threshold, being within a given value range, or being outside a given value range.

In an example of the disclosure, the data compression unit may screen and compress input data according to the sparse index values of the data to obtain data to be operated; or, make determination according to the values of data, and then screen and compress the input data to obtain data that satisfy the compression determination condition.

In an example of the disclosure, the data compression unit may screen and compress input neuron data according to the sparse index values of synaptic data to obtain neuron data to be operated, or screen and compress input synaptic data according to the sparse index values of neuron data to obtain synaptic data to be operated.

In an example of the disclosure, the data compression unit may compare the values of synapses with a given threshold, then screen and compress the synapses to obtain synaptic data of which the absolute value is not less than a given threshold, or compare the values of neurons with a given threshold, then screen and compress the neurons to obtain neuron data of which the absolute value is not less than the given threshold.

In an example of the disclosure, the data processing module may further be configured to determine whether to send a gradient and data to be operated to the operation module according to a gradient determination condition.

In an example of the disclosure, the gradient determination condition may include a threshold determination condition or a function mapping determination condition.

In an example of the disclosure, the threshold determination condition may include: being less than a given threshold, being greater than a given threshold, being within a given value range, or being outside a given value range.

In some examples, when the data processing module determines that the absolute value of a neuron gradient is less than a given compression threshold, the gradient and a corresponding synapse to be operated may be compressed, which in other words, means that the gradient and the corresponding synapse to be operated may not be sent to the operation module for operating; otherwise, when the absolute value of a gradient is not less than the given compression threshold, the gradient and a corresponding synapse to be operated may be sent to the operation module for operating.

As an alternative example, when synapses are stored in a sparse form, before being transferred to the operation module, the synapses and the indices values of the synapses may be expanded by the data processing module and may be expanded into a non-sparse form.

In an example, the operation module may include:

a first operation unit including a plurality of PEs, where each PE may include a multiplier and/or an adder for performing multiplication operation, addition operation, or multiplication-addition operation;

a second operation unit including two sets of adder trees, where each set of the adder trees may include a plurality of adder trees for performing accumulation operation; and a third operation unit including ALU.

In an example, the first operation unit may include M*N PEs, where each PE may include one multiplier and one adder; the second operation unit may include two sets of adder trees, where one set may include M adder trees of N input, and the other set may include N adder trees of M input; the third operation unit may include max(M,N) ALUs; and M and N represent positive integers.

In the operation module of an example, the first operation unit may be configured to perform multiplication on gradients and synapses, which in other words, refers to performing one-to-one multiplication on the synapses and the corresponding gradients; the second operation unit may employ an adder tree to accumulate data to be accumulated which belong to the same column; if an accumulation result is not a final accumulation result needed, then the accumulation operation is not finished, the third operation unit may be skipped and an intermediate result may be stored into a caching unit to be accumulated at a next turn; otherwise, the following operation may be performed by ALU in the third operation unit.

In an example, if an activation function exists at a previous layer, the third operation unit may further be configured to multiply the accumulation result by an inverse function of the activation function to obtain a final gradient.

In an example, the third operation unit may further be configured to perform zero-setting on the gradient according to a zero-setting determination condition.

In an example, the zero-setting determination condition may be a threshold determination condition, if the absolute value of a gradient is less than the zero-setting threshold, the gradient may be set to zero; otherwise, the gradient may remain unchanged.

In an example, the training device may further include:
a storage module that may be configured to store data; and
a control module that may be configured to store and send instructions to control the storage module, the data control module, and the operation module.

An example of the present disclosure provides a chip including the training device provided.

An example of the present disclosure further provides a chip package structure including the chip.

Another example of the present disclosure provides a board card including the chip package structure.

Another example of the present disclosure provides an electronic device including the board card.

It can be seen from the technical scheme above that the sparse training device of the disclosure may have at least one of the following technical effects:

(1) the sparse training device of the disclosure may be capable of effectively accelerating back training, which may greatly improve the speed of training and reduce the power consumption of training.

(2) the power consumption of training may be reduced through expanding or compressing data.

(3) meanwhile, the sparse training device of the disclosure may be capable of supporting forward inference of a sparse or dense neural network very well, and may thus be configured to accelerate the training process of an entire neural network.

(4) further improving the effectiveness and the speed of operation by adding a gradient determination condition and a zero-setting determination condition in back training.

DETAILED DESCRIPTION

The present disclosure is explained more fully hereinafter with reference to specific examples and the accompanying drawings to facilitate a better understanding of the purposes, technical schemes and advantages of the disclosure.

It should be noted that in the description of the drawings or the specification, reference is made to the drawings, and the same reference numbers used designate the same or similar parts. The implementations that are not illustrated or described in the drawings are well-known to persons having ordinary skill in the art of the disclosure. Also, it should further be noted that, though instances including the parameters of specific values are provided herein, the parameters need not exactly equal the corresponding values. Instead, the parameters may approximates the corresponding values within an acceptable error tolerance or a design constraint. In addition, the location words used in the examples hereinafter, such as "up", "down", "front", "back", "left", "right", and the like, merely indicate the location in the reference drawings. Thereby, the location words used are not intended to limit the disclosure.

Unless otherwise defined, all technical and scientific terms used herein have the same meaning as commonly understood by persons having ordinary skill in the art of the disclosure. The terms used in the specification of the disclosure are merely for the purpose of describing specific examples and are not intended to limit the disclosure. The phrase "and/or" used herein refers to the random and all combinations of one or a plurality of related items listed.

Figure 1:
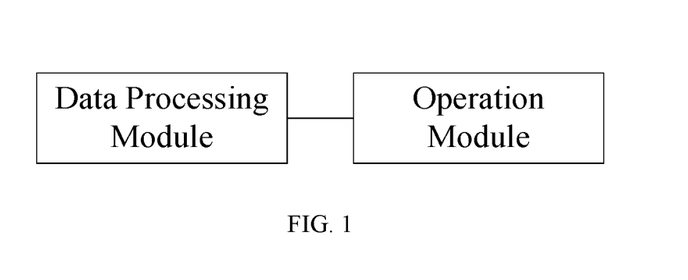
FIG. 1 is a structural diagram of a training device in an example of the disclosure.

FIG. 1 is a structural diagram of a training device provided in an example of the present disclosure. The training device may include: a data processing module that may be configured to compress or expand input data; and, an operation module that may be connected to the data processing module and configured to receive data processed by the data processing module to perform operations.

As an alternative example, the data processing module may include: a data compression unit that may be configured to compress input data according to a compression determination condition; and a data expansion unit that may be configured to expand input data according an expansion determination condition.

As an alternative example, the data expansion unit may be configured to expand input data by expanding compressed sparse data into an uncompressed format.

As an alternative example, the compression determination condition may include a threshold determination condition or a function mapping determination condition. The expansion determination condition may also include a threshold determination condition or a function mapping determination condition. Alternatively, the threshold determination condition may include: being less than a given threshold, being greater than a given threshold, being within a given value range, or being outside a given value range.

As an alternative example, the data compression unit may screen and compress input data according to the sparse indices of data to obtain data to be operated; or may determine according to the values of data, and then may screen and compress to obtain values that satisfy the compression determination condition.

As an alternative example, the data compression unit may screen and compress input neuron data according to the sparse indices of synaptic data to obtain neuron data to be operated; or may screen and compress input synaptic data according to the sparse indices of neuron data to obtain synaptic data to be operated.

As an alternative example, the data compression unit may compare synaptic values with a given compression threshold, screen and compress to obtain synaptic data whose absolute values are not less than the given compression threshold; or may compare neuron values with the given compression threshold, screen and compress to obtain neuron data whose absolute values are not less than the given compression threshold.

As an alternative example, the data processing module may further be configured to determine whether to send gradients and data to be operated to the operation module according to a gradient determination condition. Alternatively, the gradient determination condition may include a threshold determination condition or a function mapping determination condition. Alternatively, the gradient determination condition may include: being less than a given threshold, being greater than a given threshold, being within a given value range, or being outside a given value range.

As an alternative example, when the data processing module determines the absolute value of a neuron gradient is less than a given compression threshold, the gradient and a corresponding synapse to be operated may be compressed, which in other words, means that the gradient and the corresponding synapse to be operated may not be sent to the operation module for operating; otherwise, when the absolute value of a gradient is not less than the given compression threshold, the gradient and a corresponding synapse to be operated may be sent to the operation module for operating.

As an alternative example, when synapses are stored in a sparse form, before being transferred to the operation module, the synapses and the indices values of the synapses may be expanded by the data processing module and may be expanded into a non-sparse form.

As an alternative example, the operation module of the training device may include: a first operation unit including a plurality of PEs, where each PE may include a multiplier and/or an adder for performing multiplication operation, addition operation, or multiplication-addition operation; a second operation unit including two sets of adder trees, where each set of the adder trees may include a plurality of adder trees for performing accumulation operation; and a third operation unit including ALU.

As an alternative example, the first operation unit may include M*N PEs, where each PE may include one multiplier and one adder; the second operation unit may include two sets of adder trees, where one set may include M adder trees of N input, and the other set may include N adder trees of M input; the third operation unit may include max(M,N) ALUs; and M and N represent positive integers.

As an alternative example, the first operation unit may be configured to perform multiplication on gradients and synapses, which in other words, refers to performing one-to-one multiplication on the synapses and the corresponding gradients, and the second operation unit may employ an adder tree to accumulate data to be accumulated which belong to the same column; if the accumulation result is not a final accumulation result needed, then the accumulation operation is not finished, the third operation unit may be skipped and the intermediate result may be stored into a caching unit to be accumulated at a next turn; otherwise, the following operation may be performed by ALU in the third operation unit.

As an alternative example, if an activation function exists at a previous stage of the third operation unit, the third operation unit may further be configured to multiply the accumulation result by an inverse function of the activation function to obtain a final gradient.

As an alternative example, the third operation unit may further be configured to perform zero-setting on the gradient according to a zero-setting determination condition.

As an alternative example, the zero-setting determination condition may be a threshold determination condition, if the absolute value of a gradient is less than the zero-setting threshold, the gradient may be set to zero; otherwise, the gradient may remain unchanged.

As an alternative example, the training device above may further include: a storage module that may be configured to store data; a control module that may be configured to store and send instructions to control the storage module, the data control module, and the operation module.

Figure 2:
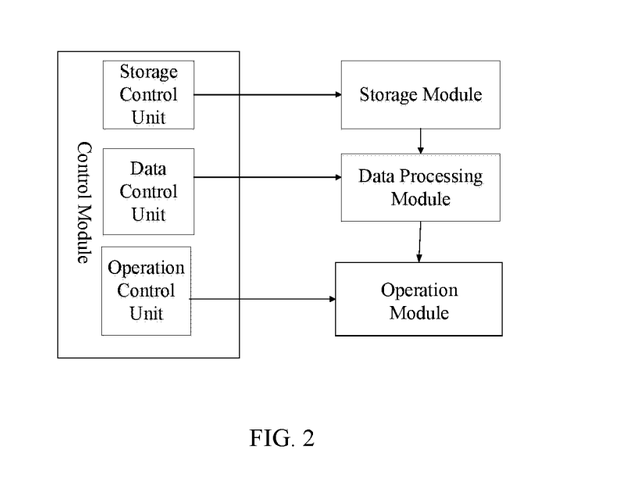
FIG. 2 is a structural diagram of an operation module in a training device in an example of the disclosure.

FIG. 2 is a structural diagram of a training device provided in an example of the present disclosure. The training device may be used for sparse training of a neural network and may be capable of supporting a whole training process of the neural network. The training device may include a control module, a storage module, a data processing module, and an operation module.

The control module may be capable of controlling the storage module, the data control module, and the operation module to achieve an orderly cooperation within the sparse training device. Alternatively, the control module may control the operation of the storage module, the data control module, and the operation module by sending control instructions stored in the control module. The storage module may be mainly configured to store data, where the data may include neuron data, synaptic data, intermediate result data, final result data which are to be operated during an operation process, other related parameters required in the operation, and the like. The data processing module may be mainly configured to screen data to be operated, and select data that need to be input into the operation module for operating according to a determination condition. The operation module may be mainly configured to perform neural network operations and send intermediate result data and final result data that need to be stored back into the storage module for storing.

Figure 3:
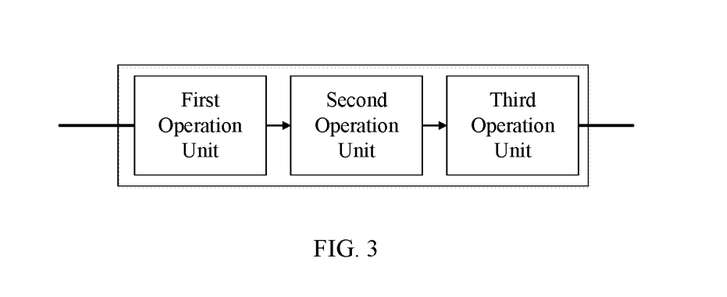
FIG. 3 is a structural diagram of an operation module in a training device in an example of the disclosure.
Figure 4:
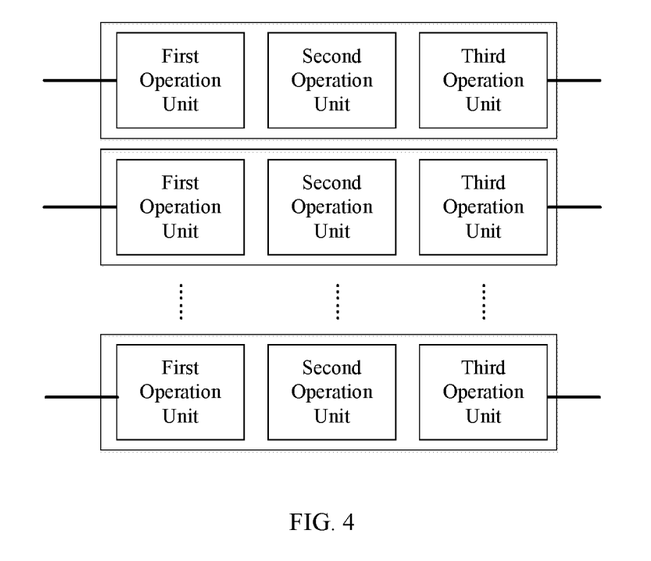
FIG. 4 is a structural diagram of an operation module in a training device in an example of the disclosure.

As an alternative example, as shown in FIGS. 3 and 4, the operation device of the training device described above may include a plurality groups of operation units, where each group of operation units may include a first operation unit, a second operation unit, and a third operation unit. The first operation unit may include a plurality of PEs, where each PE may include a multiplier and/or an adder for performing multiplication, addition, or multiplication-addition operation. The second operation unit may include a plurality of adder trees for performing accumulation. The third operation unit may include ALU, which may optionally be lightweight ALU that refers to the ALU with functions needed. The operation module may be configured to perform a series of non-linear operations including exponentiation, activation, comparison, and basic operations including individual multiplication and addition. Each operation unit of the operation module may be capable of performing a training process by cooperation, It should be noted that in an actual operation, a pipeline operation may be performed on the first operation unit, the second operation unit, and the third operation unit according to actual demands, an operation unit or an operation part of an operation unit may also be skipped, for instance, an accumulation operation in the second operation unit may not be needed in a POOLING layer and may thus be skipped directly.

Figure 5:
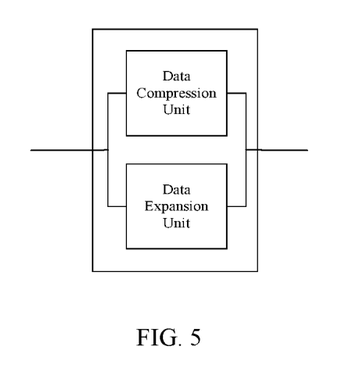
FIG. 5 is a structural diagram of an operation module in an example of the disclosure.

FIG. 5 is a structural diagram of a data processing module of a training device provided in an example of the present disclosure. The data processing module may include a data compression unit and a data expansion unit. The data compression unit may compress input data according a compression determination condition; the data expansion unit may be configured to expand input data according to an expansion determination condition. The compression determination condition and the expansion determination condition may include a threshold determination condition or a function mapping determination condition. The threshold determination condition may be one of the following: being less than a given threshold, being greater than a given threshold, being within a given value range, or being outside a given value range.

As an alternative example, the data compression unit may be capable of compressing data, alternatively, the data compression unit may be capable of compressing neuron data as well as synaptic data. Specifically, when synaptic data are in sparse representation, the data compression unit may be capable of screening and compressing input neuron data according to the sparse indices of the synaptic data, and the "valid" neuron data to be operated may be selected and sent to a next operation module together with synaptic values for operating. Otherwise, when neuron data are in sparse representation, the data compression unit may screen and compress input synaptic data according to the sparse indices of the neuron data.

Figure 6:
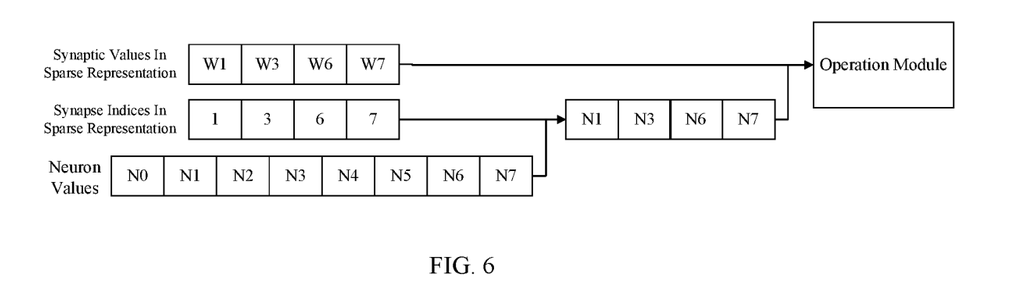
FIG. 6 is a schematic diagram of data compression by a data compression unit in an example of the disclosure.

For instance, as shown in FIG. 6, synapses are data in sparse representation, neurons are data in dense representation, and the data compression unit may compress neuron values according to the indices of the synapses in sparse representation. Sparse representation employed herein may include two arrays, where a first array may be configured to record synaptic values that are in sparse representation, and the other array may be configured to store corresponding locations of the synaptic values, which in other words, refers to indices. A length of an initial number sequence is assumed to be 8. Then according to index values, synaptic values in sparse representation are located at $1^{st}$, $3^{rd}$, $6^{th}$, $7^{th}$ locations respectively (a starting location is 0), according to the group of index values, values to be operated are selected from neuron values, where the values to be operated are neurons that located at the $1^{st}$, $3^{rd}$, $6^{th}$, $7^{th}$ locations, then, the neuron data to be operated are selected to obtain a compressed neuron sequence, which is N1N3N6N7 and is then operated with the synaptic values in sparse representation in the same operation unit.

In addition, the data compression unit may also make determine according to the values of data so as to screen and compress the data to obtain values that satisfy a compression determination condition, and transfer to a next operation module for operating. Taking a threshold determination condition as an instance, the data compression unit may compare the values of synapses with a given threshold, then screen and compress synaptic data of which the absolute values are not less than the given threshold. The data compression unit may also compare the values of neurons with the given threshold, then screen and compress to obtain neuron data of which the absolute values are not less than the given threshold.

Figure 7:
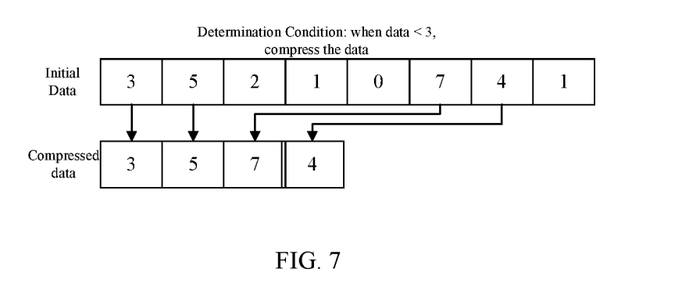
FIG. 7 is a schematic diagram of data compression by a data compression unit in an example of the disclosure.

Certainly, the data compression unit may also perform compression according to values of data. FIG. 7 shows a data compression unit, which is provided in the present disclosure, performing compression according to the values of data. A length of an initial sequence is assumed to be 8, where the sequence is 35210741 respectively. A compression condition is given, for instance, the compression condition may be compressing values less than 3, then 012 are compressed and screened out, and other values are retained to form a compressed sequence, which is 3574.

As an alternative example, the data expansion unit of the data processing module may be configured to expand input data. The data expansion unit may expand neuron data as well as synaptic data. Expanding data refers to expanding originally compressed sparse data into an uncompressed format.

Figure 8:
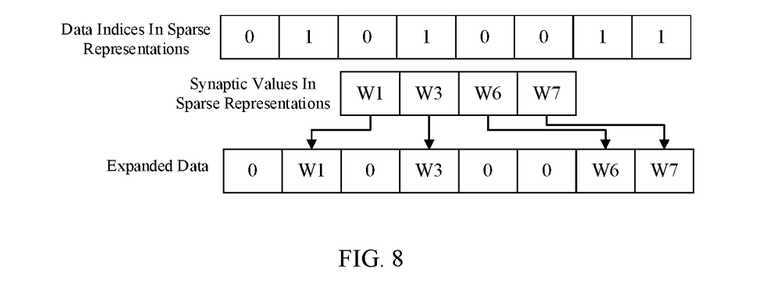
FIG. 8 is a schematic diagram of data expansion by a data expansion unit in an example of the disclosure.

For instance: FIG. 8 shows an example in which a data expansion unit provided in the present disclosure expands synaptic data in sparse representation. The sparse representation employed herein include two arrays, where one of the arrays may be configured to record synaptic values that are in sparse representation, and the other array may be configured to store corresponding locations of the synaptic values, which in other words, refers to indices. A length of an initial number sequence is assumed to be 8. Then according to indices, each location in a sequence corresponds to one number in the initial sequence. 1 represents that an initial sequence value is valid, which in other words, means that the initial sequence value is not 0. 0 represents that an initial sequence value is 0, which indicates that the synaptic values in sparse representation are located at the $1^{st}$, $3^{rd}$, $6^{th}$, $7^{th}$ locations respectively (the starting location is 0). According to the group of indices, synaptic values are placed at locations corresponding to the indices, other locations are 0, and then an expanded non-compressed sequence is obtained.

It should be noted that, when the data processing module processes data, if data need not be compressed or expanded, the data processing module may be skipped, and the storage module may transfer the data to the operation module directly for operating.

Figure 9:
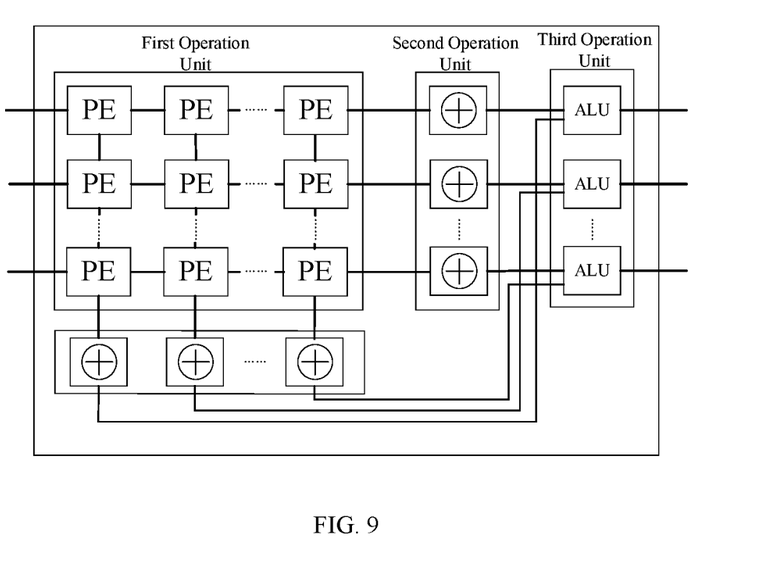
FIG. 9 is a structural diagram of an operation module of a training device in an example of the disclosure.

An example of the present disclosure provides a training device. FIG. 9 shows a structure of an operation module of the training device, where a first operation unit of the operation module may include M*N PEs, where each PE may include one multiplier and one adder. A second operation unit of the operation module may include one or more sets of adder trees, where each set of adder trees may include M adder trees of N input. Alternatively, the second operation unit of the operation module may include two sets of adder trees. In this case, one set of adder trees may include M adder trees of N input, and the other set of adder trees may include N adder trees of M input. Alternatively, the second operation unit may also include one set of adder trees, where the set of adder trees may include max(M,N) adder trees. The same operation can be performed simply by adding a corresponding data transfer wire. A third operation unit of the operation module may include max(M,N) (in other words, the larger one from M and N may be taken) lightweight ALUs (in other words, ALU may only include required operation components of an operation).

An example of the present disclosure takes a convolutional layer of a sparse convolution neural network as an instance to illustrate a process of back training performed by the training device provided in the example above. The device may be capable of accelerating back training. It can be assumed that during back training, gradient represents an input gradient from a lower layer, w represents a synapse of forward inference, index represents a corresponding sparse index, and input represents an input neuron value of forward inference. It should be noted that, during back training, the data processing module may determine whether or not to send a gradient and data to be operated to the operation module according to a gradient determination condition. A detailed process is as follows:

Firstly, updating a neuron gradient gradient' of an upper layer. Sending a fetch instruction by the control module, reading a gradient gradient and a corresponding synapse w and sending them to the data compression unit of the data processing module for screening and compressing. If the absolute value of gradient is less than a given compression threshold, skipping gradient and a corresponding synapse to be operated, which in other words, means not sending gradient and the corresponding synapse to the operation module for operations; if the absolute value of gradient is not less than the given compression threshold, sending gradient together with the corresponding synapse w to the operation module for operations. In addition, if the synapse w is stored in sparse representation, to facilitate accumulation of gradients of neurons, before sending w into an operation part, sending w together with index to the data expansion unit of the data processing module for expansion into a non-sparse mode, and then sending w together with gradient to the operation module for operations. In the operation module, firstly, sending the gradient and the synapse to the first operation unit for multiplication of the gradient and the synapse, where one-to-one multiplication may be performed on w and a corresponding gradient, then sending results of the multiplication to an adder tree in the second operation unit corresponding to the column, and accumulating, by the adder tree, data to be accumulated which belong to the same column. Determining whether the accumulation result is a final accumulation result needed according to whether a preset count of operations/number of cycles/beats is reached. If the accumulation result is not the final accumulation result needed, the accumulation operation is not finished, skipping the third operation unit, and storing the intermediate result for accumulation in a next turn; otherwise, sending the accumulation result to corresponding ALU in the third operation unit for subsequent operations. If an activation function exists at the upper layer, multiplying the accumulation result and the inverse function of the activation function in the third operation unit to obtain a final gradient'. The ALU in the third operation unit may be configured to perform zero-setting on gradients according to a zero-setting determination condition. In an instance where a zero-setting threshold determination condition is set as the zero-setting determination condition, if a user provides a zero-setting threshold, determining in the third operation unit that if the absolute value of gradient' is less than the zero-setting threshold, gradient'=0, otherwise, gradient' remains unchanged. Storing the result back into the storage module. Certainly, the zero-setting threshold may also be another determination condition, such as a function mapping. If gradient' satisfies a given determination condition, setting gradient' to zero and storing gradient', otherwise, storing the initial value.

Then, updating the synapse. Sending a fetch instruction by the control module, and reading neuron data input, index data index corresponding to the synapse w, and sending them to the data compression unit of the data processing module for compressing after reading the gradient gradient. In other words, compressing input according to index, then sending it to the operation module for operations. For each group of operation units, firstly, sending the gradient gradient and the initial neuron data input to the first operation unit for multiplication, where one-to-one multiplication may be performed on input and a corresponding gradient, then sending the results of the multiplication to the second operation unit, and accumulating, by an adder tree, data to be accumulated which belong to the same row. If the accumulation result is not a final accumulation result needed, the accumulation operation is not finished, skipping the third operation unit, and storing the intermediate result for accumulating in a next time; otherwise, sending the accumulation result to corresponding ALU in the third operation unit for subsequent operations. Receiving, by the third operation unit, the accumulated data, and dividing the accumulated data by a count of gradients connected to the synapse to obtain an update amount of the synapse. Multiplying the update amount by a learning rate, and storing the result in the storage module. Then, reading the synapse w and the update amount of the synapse from the storage module, and sending them to the first operation unit of the operation module for individual addition. Since other accumulation and non-linear operations may not be needed, the second and the third operation units may be skipped directly, and the updated synaptic data may be stored.

The training device may also be capable of supporting forward inference of a sparse neural network or a dense neural network, of which a process may be similar to the process of updating synapses, therefore, the training device provided in the present disclosure may be used for accelerating a training process of a whole neural network.

In another example of the present disclosure, a fully connected layer of a sparse convolution neural network is taken as an instance to illustrate the accelerating of back training by the training device provided in the present disclosure. It is assumed that during back training, gradient represents a gradient input from a lower layer, w represents a synapse of forward inference, index represents a corresponding sparse index, and input represents an input neuron value of forward inference. A detailed training process is as follows:

Firstly, updating a gradient gradient' of an upper layer. Sending a fetch instruction by the control module, reading a gradient gradient and a corresponding synapse w and sending them to the data compression unit of the data processing module for screening and compressing. Giving a determination threshold, if the absolute value of gradient is less than the given threshold, skipping gradient and a corresponding synapse to be operated, which in other words, means not sending gradient and the corresponding synapse to the operation module for operations; if the absolute value of gradient is not gradient together with the corresponding synapse w to the operation module for operations. Besides the determination threshold, the determination condition may also be another condition such as a determination range and a function mapping. If a given condition is satisfied, skipping Gradient and the corresponding synapse to be operated. If the synapse w is stored in sparse representation, before sending w into the operation module, sending w together with index to the data expansion unit of the data processing module for expansion into a non-sparse mode, and then sending w together with gradient to the operation module for operations. In the operation module, firstly, sending the data to the first operation unit for multiplication of the gradient and the synapse, where one-to-one multiplication may be performed on w and the corresponding gradient, then sending results of the multiplication to an adder tree in the second operation unit corresponding to the column, and accumulating, by the adder tree, N data to be accumulated which belong to the same column. If the accumulation result is not the final accumulation result needed, which in other words means that the accumulation operation is not finished, skipping the third operation unit, and storing the intermediate result for accumulation in a next turn; otherwise, sending the accumulation result to corresponding ALU in the third operation unit for subsequent operations. If an activation function exists at the upper layer, multiplying the accumulation result and the inverse function of the activation function in the third operation unit to obtain a final gradient'. If a user provides a zero-setting threshold, determining in the third operation unit that if the absolute value of gradient' is less than the zero-setting threshold, gradient otherwise, gradient' remains unchanged. Writing the result back to the storage module for storing. Besides the zero-setting threshold, the determination condition may be another condition such as a function mapping. If gradient' satisfies a given determination condition, setting gradient' to zero and storing gradient', otherwise, storing the initial value.

Then, updating the synapse. Sending a fetch instruction by the control module, reading neuron data input, index data index corresponding to the synapse w, and sending them to the data compression unit of the data processing module for compressing after reading the gradient gradient. In other words, compressing the input neuron input according to the synaptic index data index, then sending the input neuron input to the operation module for operating. For each group of operation units, firstly, sending data to the first operation unit for multiplication, where one-to-one multiplication may be performed on input and a corresponding gradient to obtain an update amount of the synapse. Multiplying the update amount of the synapse by a learning rate, and adding the result with the initial synapse received by PE from the storage module together to obtain a new synapse w. Then skipping the second and the third operation units, and storing the new synapse w.

It should be noted that, although in the above examples, a gradient determination is performed according to a given threshold, a gradient determination condition of the present disclosure is not limited to a threshold determination condition and may also be a function mapping determination condition. The threshold determination condition may include: being less than a given threshold, being greater than a given threshold, being within a given value range, or being outside a given value range. Moreover, a gradient determination condition, a compression determination condition, and an expansion determination condition of the present disclosure may be set as the same determination condition (in other words, all of them may be set as a threshold determination condition, where a threshold may be the same or different), and may also be set as different determination conditions (for instance, they may be set as threshold determination condition and mapping determination condition respectively, where a threshold and a mapping relation may also be different), which does not affect the implementations of the present disclosure.

The training device provided in the present disclosure may also be capable of supporting forward inference of a sparse neural network or a dense neural network, of which the process may be similar to the process of updating synapses. Therefore, the training device provided in the present disclosure can be used for accelerating training process of a whole neural network. In addition, the training device of the present disclosure can be applied not only in a fully connected layer and a convolutional layer of a neural network, but also in other layers.

All the modules of the training device provided in the present disclosure may be implemented in a form of hardware, where a physical implementation of the hardware may include, but is not limited to a physical component, where the physical component may include but is not limited to a transistor, a memristor, and a DNA computer.

An example of the present disclosure provides a chip including the training device provided in any of the above-mentioned examples.

An example of the present disclosure further provides a chip package structure including the chip provided in the example above.

Another example of the present disclosure provides a board card including the chip package structure provided in the example above.

Another example of the present disclosure provides an electronic device including the board card provided in the example above. The electronic device may include a data processing device, a robot, a computer, a printer, a scanner, a tablet, a smart terminal, a mobile phone, a driving recorder, a navigator, a sensor, a webcam, a cloud server, a camera, a video camera, a projector, a watch, an earphone, a mobile storage, a wearable device, a vehicle, a household appliance and/or a medical facility.

The vehicle may include an airplane, a ship and/or a car. The household appliance may include a television set, an air conditioner, a microwave oven, a refrigerator, a rice cooker, a humidifier, a washing machine, an electric lamp, a gas stove, and a range hood. The medical device may include a nuclear magnetic resonance instrument, a B-ultrasound machine, and/or an electrocardiograph.

The above-mentioned examples merely describe several implementations of the disclosure. It should be understood that the description of the examples, while being relatively specific and detailed, are not given by way of limitation on the scope of the disclosure. It should be noted that, those skilled in the art may make changes and modifications without departing from the disclosure in its broader aspects, which all fall within the scope of protection of the disclosure. Therefore, the protection scope of the disclosure should be subject to the protection scope of the claims.

What is claimed is:

1. A training device comprising:
a data processing circuit configured to compress or expand input data; and
an operation circuit connected to the data processing circuit and configured to receive data processed by the data processing circuit to perform operations, wherein the operation circuit includes:
a first operation circuit including a plurality of PEs (Processing Element), wherein each PE includes a multiplier and/or an adder for performing multiplication operations, addition operations, or multiplication-addition operations,
a second operation circuit including two sets of adder trees, wherein each set of the adder trees include a plurality of adder trees for performing accumulation operations, and
a third operation circuit including ALU (Arithmetic Logical Unit), wherein the first operation circuit includes M*N PEs, wherein each PE includes one multiplier and one adder, the second operation circuit includes two sets of adder trees, wherein one set includes M adder trees of N input, and the other set includes N adder trees of M input, and the third operation circuit includes max(M,N) ALUs, wherein M and N represent positive integers.

2. The training device of claim 1,
wherein the data processing circuit includes:
a data compression circuit configured to compress input data according to a compression determination condition, and
a data expansion circuit configured to expand input data according to an expansion determination condition, and
wherein the data expansion circuit is configured to expand the input data by expanding compressed sparse data into an uncompressed format.

3. The training device of claim 2,
wherein the compression determination condition and the expansion determination condition include a threshold determination condition or a function mapping determination condition, and wherein the threshold determination condition includes: being less than a given threshold, being greater than a given threshold, being within a given value range, or being outside a given value range.

4. The training device of claim 2, wherein the data compression circuit is configured to screen and compress input data according to sparse index values of the input data to obtain data to be operated.

5. The training device of claim 2, wherein the data compression circuit is configured to:
make a determination according to values of the input data, and
screen and compress the input data to obtain data that satisfies the compression determination condition.

6. The training device of claim 4, wherein the data compression circuit is configured to screen and compress input neuron data according to sparse index values of synaptic data to obtain neuron data to be operated.

7. The training device of claim 4, wherein the data compression circuit is configured to screen and compress input synaptic data according to sparse index values of neuron data to obtain synaptic data to be operated.

8. The training device of claim 4, wherein the data compression circuit is configured to:
compare values of synapses with a given threshold,
screen and compress the synapses to obtain synaptic data which absolute values are not less than the given threshold.

9. The training device of claim 4, wherein the data compression circuit is configured to:
compare values of neurons with the given threshold,
screen and compress the neurons to obtain neuron data whose absolute values are not less than the given threshold.

10. The training device of claim 1, wherein the data processing circuit is further configured to determine whether to send a gradient and data to be operated to the operation circuit according to a gradient determination condition.

11. The training device of claim 10,
wherein the gradient determination condition includes a threshold determination condition or a function mapping determination condition, and
wherein the threshold determination condition includes: being less than a given threshold, being greater than a given threshold, being within a given value range, or being outside a given value range.

12. The training device of claim 10, wherein when the data processing circuit determines an absolute value of a neuron gradient is less than a given threshold, the gradient and a corresponding synapse to be operated are compressed, and when an absolute value of a gradient is not less than the given threshold, the gradient and a corresponding synapse to be operated are sent to the operation circuit for operating.

13. The training device of claim 10, wherein when synapses are stored in a sparse form, before the synapses are input to the operation circuit, the data processing circuit is configured to expand the synapses and indices values of the synapses, and expand the synapses and the indices values of the synapses into a non-sparse form.

14. The training device of claim 1, wherein in the operation circuit, the first operation circuit is configured to perform one-to-one multiplication on the synapses and corresponding gradients, and the second operation circuit is configured to accumulate data to be accumulated which belong to a same column, by an adder tree, when an accumulation result is not a final accumulation result that is needed, an accumulation operation is not finished, the third operation circuit is skipped and an intermediate result is stored in a caching circuit for accumulating at a next turn, otherwise, ALU in the third operation circuit performs subsequent operations.

15. The training device of claim 14, wherein when an activation function exists at a previous stage, the third operation circuit is further configured to multiply the accumulation result by an inverse function of the activation function to obtain a final gradient.

16. The training device of claim 15, wherein the third operation circuit is further configured to perform zero-setting on the gradient according to a zero-setting determination condition, and
wherein the zero-setting determination condition is a threshold determination condition, if an absolute value of a gradient is less than a zero-setting threshold, the gradient is set to zero, otherwise, the gradient remains unchanged.

17. The training device of claim 1, wherein, the training device further includes:
a storage circuit configured to store data,
a control circuit configured to store and send instructions so as to control the storage circuit, the data control circuit, and the operation circuit.

18. A training method, comprising:
compressing or expanding, by a data processing circuit, input data; and
receiving, by an operation circuit connected to the data processing circuit, data processed by the data processing circuit to perform operations,
wherein the operation circuit includes:
a first operation circuit including a plurality of PEs (Processing Element), wherein each PE includes a multiplier and/or an adder for performing multiplication operations, addition operations, or multiplication-addition operations,
a second operation circuit including two sets of adder trees, wherein each set of the adder trees include a plurality of adder trees for performing accumulation operations, and
a third operation circuit including ALU (Arithmetic Logical Unit), wherein the first operation circuit includes M*N PEs, wherein each PE includes one multiplier and one adder, the second operation circuit includes two sets of adder trees, wherein one set includes M adder trees of N input, and the other set includes N adder trees of M input, and the third operation circuit includes max(M,N) ALUs, wherein M and N represent positive integers.

19. An electronic device, comprising:

a training device that includes:

a data processing circuit configured to compress or expand input data; and an operation circuit connected to the data processing circuit and configured to receive data processed by the data processing circuit to perform operations, a first operation circuit including a plurality of PEs (Processing Element), wherein each PE includes a multiplier and/or an adder for performing multiplication operations, addition operations, or multiplication-addition operations, a second operation circuit including two sets of adder trees, wherein each set of the adder trees include a plurality of adder trees for performing accumulation operations, and a third operation circuit including ALU (Arithmetic Logical Unit), wherein the first operation circuit includes M*N PEs, wherein each PE includes one multiplier and one adder, the second operation circuit includes two sets of adder trees, wherein one set includes M adder trees of N input, and the other set includes N adder trees of M input, and the third operation circuit includes max(M,N) ALUs, wherein M and N represent positive integers.

\* \* \* \* \*